(No Model.)
W. TUCKER.
APPARATUS FOR CASTING COUPLINGS FOR SHAFTS.
No. 272,800. Patented Feb. 20, 1883.
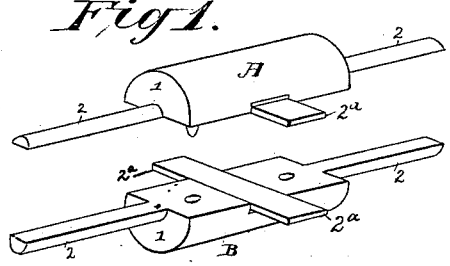
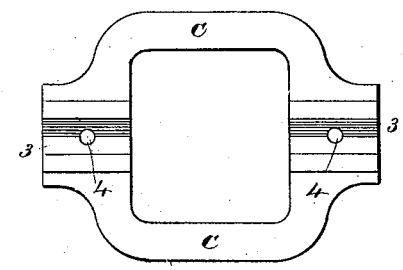
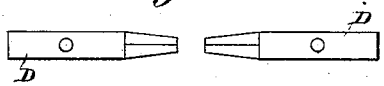
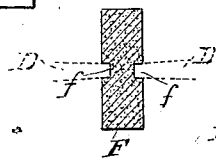
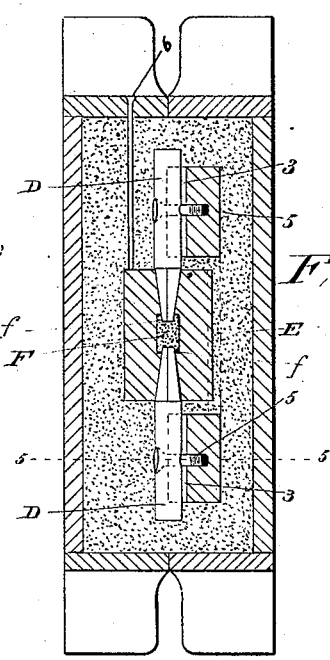
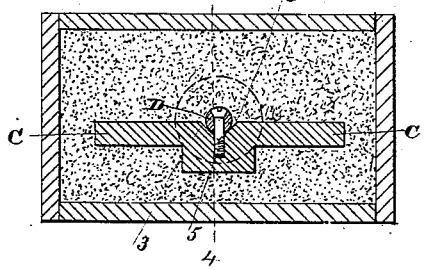
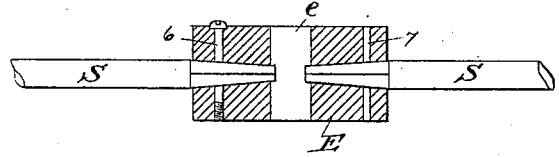
Attest:
Geo. T. Smallwood Jr.
R. W. Hopkins
Inventor:
William Tucker
By Knight Bros
Attys.

UNITED STATES PATENT OFFICE.

WILLIAM TUCKER, OF EAST BROOKFIELD, MASSACHUSETTS, ASSIGNOR OF ONE-HALF TO JOSIAH HOBBS, OF SAME PLACE.

APPARATUS FOR CASTING COUPLINGS FOR SHAFTS.

SPECIFICATION forming part of Letters Patent No. 272,800, dated February 20, 1883.

Application filed July 17, 1882. (No model.)

*To all whom it may concern:*

Be it known that I, WILLIAM TUCKER, a citizen of the United States, residing at East Brookfield, in the county of Worcester and State of Massachusetts, have invented a new and useful Improvement in Apparatus for Casting Couplings of Shafting, of which the following is a specification.

The object of my invention is to produce a shaft-coupling consisting of a cylindrical collar with sockets in its ends, which sockets shall be precisely in line and adapted to receive and fit the ends of the shaft-sections to be connected. For this purpose I employ a pair of chilled cores corresponding in shape with the shaft ends to be coupled, and held perfectly in line by fixing them within V-shaped grooves or bearings formed to receive them in a frame, by which they are held perfectly in line within the mold while the coupling-collar is cast upon them, as hereinafter described.

In the accompanying drawings, Figure 1 is a perspective view of the two parts of a divided pattern such as I use in carrying my invention into effect. Fig. 2 is a plan of the bearing-frame adapted to receive the chill-cores and hold them accurately in line while casting the coupling. Fig. 3 is a plan view of the chill-cores which are applied to the bearing-frame for the ramming-mold and removal of the pattern, as hereinafter described. Fig. 4 is a longitudinal section, on the line 4 4, Fig. 5, of the mold in readiness for pouring. Fig. 5 is a transverse section of the same on the line 5 5, Fig. 4. Fig. 6 is a longitudinal section of the coupling applied to the adjacent ends of the shaft, showing at the different ends of the coupling a screw and a pin, either of which may be used to secure the shaft ends within the coupling.

The pattern shown in Fig. 1 is formed of two parts, A B, each consisting of a semi-cylindrical body, 1, to form the mold-cavity for the casting of the coupling-collar, and a smaller semi-cylindrical portion or "print," 2, projecting from each end, corresponding in diameter with the shafts to be coupled. Each of these half-sections A B is provided with a transverse piece, 2$^a$, projecting at each of its sides, such projecting portions forming the cavities for receiving a sand core, which forms the transverse opening in the coupling-collar, for a purpose hereinafter described.

The core bearing frame is shown at C, consisting of a continuous frame, which may be of cast metal, with re-enforced ends of the necessary thickness for the formation of V-shaped grooves 3 3, which are produced therein, accurately in line, by planing. Holes are shown at 4 4 for the reception of screws 5 5, by which the chill-cores D D are fixed within the V-grooves 3 3 of the bearings C after the formation of the mold and before it is put together preparatory to pouring.

My mode of operation is as follows: One half, A, of the pattern is laid face down on the mold-board, and the iron frame C laid over it, with the semi-cylindrical ends 2 2 of the pattern within the V-shaped grooves 3 3 of the frame C. The flask is then filled and rammed up in the usual manner. The flask is then turned over and the other half, B, of the pattern applied face to face to the first half, A, when the other half of the mold is rammed and finished in the usual manner. The projecting ends of pieces 2$^a$ form two cavities opening into the sides of the cavity formed by the cylindrical pattern A B, such cavities being for the reception of a sand core, F, which forms a transverse opening, e, in the coupling-collar E, hereinafter described. The mold being then separated and the pattern withdrawn, the chill-cores D D are placed in the grooves 3 of the frame C, within the mold, and secured by the screws 5.

A sand core, F, which has previously been formed in the required shape, is inserted into the mold, resting at each end in the cavities formed by the projecting portions 2$^a$. This sand core F is formed with depressions $ff$, as shown in Figs. 4 and 7, which receive the inner ends of chill-cores D D. The object of this arrangement is to form the opening e of such width that the chill-cores D shall project into the said opening beyond its inner walls, so that a wedge inserted into such opening for forcing out the chills, as hereinafter described, shall not bind against its sides, but shall act directly on the inner ends of the chill-cores. The V-shaped grooves hold the said chill-cores accurately in line. The mold is then put together, as shown in Figs. 4 and 5, and is ready for casting the coupling. This done, the mold is opened, the said sand core F being first forced out of the opening e of the coupling-collar, and the chill-cores D D are withdrawn from the ends of the coupling-collar E by a wedge, (not shown,) which is introduced between the inner ends of said chill-cores, and upon which a sharp blow is administered, leaving holes ready to receive the ends of the shafts S S, which are milled off to correspond exactly with the ends of the chill-cores D D. These ends may be square, hexagonal, octagonal, or of any preferred shape adapted to form an efficient coupling-connection between the shaft ends and the coupling-collar.

The ends are tapered, as represented, to permit the drawing out of the chill-cores, as above described. The shaft ends may be held within the coupling by screws, as shown at 6, or by pins, as shown at 7, as preferred.

The coupling-collar E requires only squaring on the ends, and turning on the outside, and drilling for the reception of screws or pins, and it is finished. By the use of templets, in drilling, for the screws or pins, the coupling-collars will be adapted to fit the shaft ends interchangeably.

The chill-cores can be used over and over again, and form perfect holes of any desired contour, perfectly in line, without the necessity of drilling, boring, or reaming.

Any suitable varnish is used to prevent the cohesion of the hot iron in customary manner. It is preferred to cast with the mold end up, as illustrated in Fig. 4, as in casting pipes on end, the sprue 6 being set in the end of the mold and turned up when the casting is done.

Having thus described my invention, the following is what I claim as new therein and desire to secure Letters Patent:

1. A mold for shaft-couplings, consisting of a sand matrix having a central cavity for forming the coupling-collar, and prints to receive a central core for forming a transverse opening through said collar, an embedded frame having grooves accurately in line for holding the chilled cores, the chill-cores resting in said grooves and formed of corresponding shape to the ends of the shafting to be united, and a central core resting in the core-prints formed in the matrix, said core being provided with recesses to receive the ends of the chill-cores, substantially as and for the purpose set forth.

2. The bearing-frame C, provided with the V-grooves 3 3, formed accurately in line, substantially as and for the purpose specified.

WILLIAM TUCKER.

Witnesses:
GEO. W. JOHNSON,
JOSIAH HOBBS.